2,834,788

AMINOBENZYLANILINOPHTHALIDES

Donald D. Wheeler and David C. Young, Midland, Mich., assignors to The Dow Chemical Company, Midland, Mich., a corporation of Delaware No Drawing. Application July 5, 1956
Serial No. 595,850

2 Claims. (Cl. 260—343.3)

This invention is directed to aminobenzylanilinophthalides having the structure

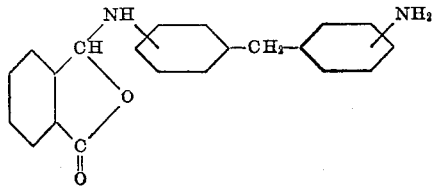

These compounds are light-colored solids somewhat soluble in organic solvents such as benzene, acetone, and ethanol, and substantially insoluble in water and petroleum ether. The compounds are useful as toxicants in insecticidal compositions.

The new compounds may be prepared by causing phthalaldehydic acid to react with methylenedianiline having the formula

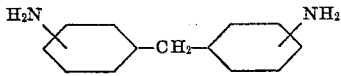

to produce the desired aminobenzylanilinophthalide. The terms "phthalaldehydic acid" and "3-hydroxyphthalide" refer to a compound having the formula

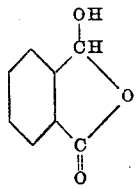

Phthalaldehydic acid is often represented in the literature as having the structure

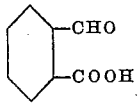

However, the acid employed in this invention and prepared as hereinafter described exists almost entirely in the 3-hydroxyphthalide ring structure, as indicated by its infrared absorption spectrum. Infrared data also indicate the phthalide products to have the same characteristic ring structure.

The reaction may be carried out in an inert solvent as reaction medium and takes place readily in the temperature range of from 20° to 150° C. with the formation of the desired phthalide products and water of reaction. Suitable solvents include acetone, benzene, butanone, water and alcohol. Good results are obtained when substantially equimolar proportions of the reactants are employed.

In carrying out the reaction, phthalaldehydic acid and the appropriate aminobenzylaniline are dissolved in or mixed with the reaction solvent. Mixing of the reactants oftentimes results in the development of heat of reaction. The reaction mixture is then heated for a period of from a few minutes to several hours to obtain the desired aminobenzylanilinophthalide product. The latter usually precipitates from the reaction mixture during the heating as a crystalline solid. The mixture is then cooled to precipitate further product and the latter recovered from the mixture by filtration. The phthalide product may be purified, if desired, by washing with or recrystallizing from a suitable solvent.

The following examples illustrate the invention but are not to be construed as limiting.

*Example 1.—3-(4-(4-aminobenzyl)anilino)phthalide*

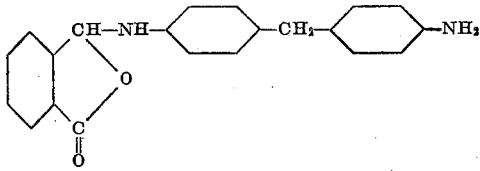

49.5 grams (0.25 mole) of p,p'-methylenedianiline and 37.5 grams (0.25 mole) of phthalaldehydic acid and 100 milliliters of acetone were mixed together. The resulting mixture was heated on the steam bath for 2 hours and then cooled in an ice bath. During the cooling, a 3-(4-(4-aminobenzyl)anilino)phthalide product precipitated and was separated by filtration. After washing with acetone and drying, the product melted at 185°–187.5° C. The product amounted to a yield of 43.5 grams or 53 percent of theoretical.

*Example 2.—3-(2-(2-aminobenzyl)anilino)phthalide*

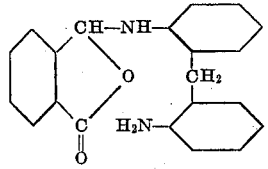

49.5 grams (0.25 mole) of 2,2'-methlenedianiline and 37.5 grams (0.25 mole) of phthalaldehydic acid and 100 milliliters of acetone are mixed together and heated on the steam bath for 45 minutes. At the end of the heating period, the mixture is cooled in an ice bath to precipitate the desired product as a crystalline solid. This 3-(2-(2-aminobenzyl)anilino)phthalide product is separated by filtration and has a molecular weight of 330.

In similar preparation the following aminobenzylanilinophthalides are prepared.

3-(4-(2-aminobenzyl)anilino)phthalide by the reaction of phthalaldehydic acid and 2,4'-methylenedianiline.

3-(4-(3-aminobenzyl)anilino)phthalide by the reaction of phthalaldehydic acid and 2,3'-methylenedianiline.

The products of the present invention are useful as insecticides. In a representative operation, substantially complete mortality was observed when cockroaches (*Periplaneta americana*) and houseflies (*Musca domestica*) were wetted with an aqueous dispersion containing 500 parts by weight of 3-(4-(4-aminobenzyl)anilino)-phthalide per million parts of ultimate dispersion.

The phthalaldehydic acid employed in this invention may be prepared by first photochlorinating o-xylene to obtain α,α,α,α',α'-pentachloro-o-xylene by passing chlorine gas into o-xylene while illuminating with sun lamps. The resulting chlorinated o-xylene is then heated with aqueous constant boiling hydrochloric acid and ferric chloride solution, as more fully disclosed in U. S. 2,748,162.

We claim:
1. An aminobenzylanilinophthalide having the structure

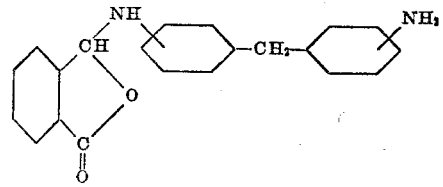

2. 3-(4-(4-aminobenzyl)anilino)pththalide.

No references cited.